UNITED STATES PATENT OFFICE.

THOMAS B. ALLEN, OF NIAGARA FALLS, NEW YORK, ASSIGNOR TO THE CARBORUNDUM COMPANY, OF NIAGARA FALLS, NEW YORK, A CORPORATION OF PENNSYLVANIA.

REFRACTORY ARTICLE AND METHOD OF MANUFACTURING THE SAME.

1,107,012.  Specification of Letters Patent.  Patented Aug. 11, 1914.

No Drawing.  Application filed November 13, 1913. Serial No. 800,769.

*To all whom it may concern:*

Be it known that I, THOMAS B. ALLEN, a subject of the King of Great Britain, residing at Niagara Falls, in the county of Niagara and State of New York, have invented a new and useful Improvement in Refractory Articles and Methods of Manufacturing the Same, of which the following is a full, clear, and exact description.

This invention has relation to a new and useful refractory article and also to a new and useful method of manufacturing the same.

Artificial crystalline alumina has many physical and chemical properties which render it valuable in the manufacture of refractory articles. Heretofore, the manufacture of such articles has been accomplished by bonding the crystalline alumina with clay or other suitable material and vitrifying the mixture in a ceramic kiln. This method of manufacture, however, obviously reduces the refractoriness of the finished articles, due to the fluxing action of the bond on the crystalline alumina and the lowered vitrifying temperature of the mass.

I have discovered that a very superior article can be produced by bonding crystalline alumina with a material which is identical in chemical composition therewith. I thereby obtain articles of very great refractoriness, which have, in fact, substantially the same melting point as pure alumina. I accomplish this result by bonding the crystalline alumina with an amorphous alumina of a more or less colloidal nature, then shaping the articles from the plastic mass, and finally heating to a temperature sufficient to set the amorphous alumina.

A preferred method of carrying out my invention is as follows. I take a warm saturated solution of ammonium aluminum sulfate and precipitate the alumina with ammonium hydroxid. The precipitate is washed with hot water and filter pressed. A sufficient quantity of this material is taken to give, preferably, from five to ten per cent. by weight of the finished article, and this is mixed with crystalline alumina of a suitable degree of fineness. The wet mass is allowed to dry slowly in order to increase the plasticity, and when in a suitable state is pressed or otherwise fashioned into shape.

The shaped article is then allowed to dry slowly and when dry has sufficient mechanical strength to be handled. It is then placed in a pottery kiln and heated to a temperature sufficient to set the amorphous alumina, a temperature of from 1300° to 1400° C. being preferably employed, although the articles will have a fair mechanical strength if a lower temperature is used. Articles formed in this manner have very superior refractory properties, since they consist essentially of pure alumina. They also have a fairly high mechanical strength. This quality can be improved by the addition of glyceroboric acid to the mixture. This may be done by mixing with the mass a solution of boric acid and glycerin. The quantity of this solution need not exceed five per cent. of the total mixture. This particular feature of the process is not, however, claimed broadly in the present application, as it forms the subject matter of my copending application Serial No. 753,468. The addition of this substance gives a higher mechanical strength to articles of crystalline alumina, and when used in conjunction with the present process, yields a product of a very highly refractory nature.

I do not desire to limit myself to the exact details of the process herein described, as they may be departed from in various ways within the scope of the appended claims without affecting my invention.

I claim:

1. The method of making refractory articles, which consists in bonding crystalline alumina with amorphous alumina.

2. The method of making refractory articles, which consists in mixing crystalline alumina with aluminum hydroxid, shaping the mixture, and then heating to a temperature sufficient to set the amorphous alumina.

3. The method of making refractory articles, which consists in mixing crystalline alumina with aluminum hydroxid, shaping the mixture, and then heating to a relatively high temperature.

4. The method of making refractory articles, which consists in mixing crystalline alumina with aluminum hydroxid, shaping the mixture, and then heating to a temperature of at least 1200° C.

5. The method of making refractory articles, which consists in bonding crystalline alumina with amorphous alumina and glyceroboric acid.

6. The process of making refractory articles, which consists in mixing crystalline alumina with aluminum hydroxid and glyceroboric acid, and then shaping the mixture and heating to a relatively high temperature.

7. The process of making refractory articles, which consists in mixing crystalline alumina with aluminum hydroxid and glyceroboric acid, and then shaping the mixture and heating to a temperature of at least 1200° C.

8. In the manufacture of refractory articles, the method of binding a crystalline refractory compound with a collodial form of the same compound.

In testimony whereof, I have hereunto set my hand.

THOS. B. ALLEN.

Witnesses:
C. J. BROCKBANK,
CHARLES N. SCOTT.